United States Patent
Geliot et al.

(10) Patent No.: US 11,702,217 B2
(45) Date of Patent: Jul. 18, 2023

(54) AIRCRAFT PYLON COMPRISING AT LEAST ONE SEAL INTERPOSED BETWEEN A FIXED STRUCTURE AND A REMOVABLE PANEL OF A FAIRING

(71) Applicant: Airbus Operations SAS, Toulouse (FR)

(72) Inventors: Jean Geliot, Toulouse (FR); Thierry Theron, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/342,118

(22) Filed: Jun. 8, 2021

(65) Prior Publication Data
US 2021/0387740 A1 Dec. 16, 2021

(30) Foreign Application Priority Data
Jun. 10, 2020 (FR) ..................................... 2006037

(51) Int. Cl.
| | | |
|---|---|---|
| *B64D 29/08* | (2006.01) | |
| *B64F 5/45* | (2017.01) | |
| *B64D 29/02* | (2006.01) | |
| *B64D 27/26* | (2006.01) | |

(52) U.S. Cl.
CPC ............. *B64D 29/08* (2013.01); *B64D 29/02* (2013.01); *B64F 5/45* (2017.01); *B64D 27/26* (2013.01)

(58) Field of Classification Search
CPC ........ B64D 29/02; B64D 29/08; B64D 27/26; B64F 5/45
See application file for complete search history.

(56) References Cited

U.S. PATENT DOCUMENTS

| | | | | |
|---|---|---|---|---|
| 4,574,325 | A * | 3/1986 | Holton | B64D 45/02 244/1 A |
| 2008/0164373 | A1* | 7/2008 | Roming | B64C 1/14 244/129.5 |
| 2011/0072634 | A1* | 3/2011 | Kamibayashiyama | F16J 15/123 29/446 |
| 2014/0345199 | A1 | 11/2014 | Yahata et al. | |
| 2019/0218840 | A1* | 7/2019 | Hacault | E05D 3/02 |

(Continued)

FOREIGN PATENT DOCUMENTS

| | | |
|---|---|---|
| EP | 3527485 A1 | 8/2019 |
| EP | 3543140 A1 | 9/2019 |
| FR | 2856331 A1 | 12/2004 |

OTHER PUBLICATIONS

French Search Report; priority document.

*Primary Examiner* — Christopher D Hutchens
*Assistant Examiner* — Steven J Shur
(74) *Attorney, Agent, or Firm* — Greer, Burns & Crain, Ltd.

(57) ABSTRACT

An aircraft pylon comprising a structure covered by a fairing. The structure includes at least one void bounded by a peripheral edge. The fairing includes at least one removable panel connected to the structure around the void and having an inner face oriented towards the structure. The structure includes at least one seal connected to the structure so as to be slightly compressed against the inner face of the removable panel. The seal extends over at least a lower portion of the peripheral edge so as to retain a fluid located below a sealing horizontal plane while ensuring ventilation beneath the fairing.

7 Claims, 3 Drawing Sheets

(56) References Cited

U.S. PATENT DOCUMENTS

2019/0256186 A1 8/2019 Casse et al.
2019/0291882 A1 9/2019 Theron
2020/0070992 A1 3/2020 Theron

* cited by examiner

Fig. 4 Prior Art
Fig. 5 Prior Art
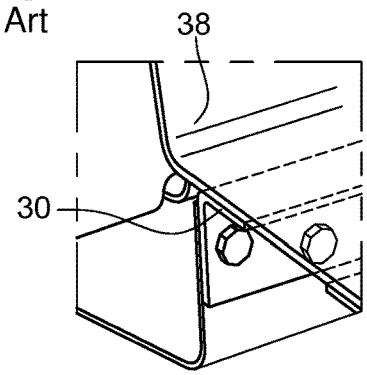
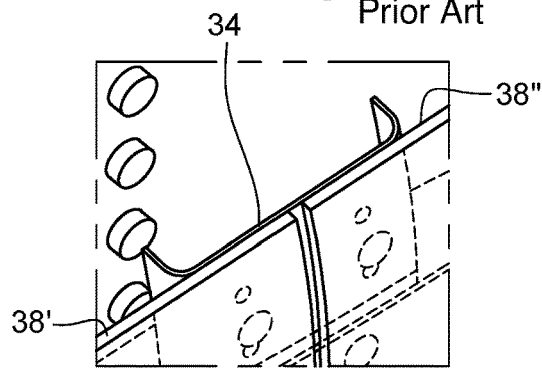
Fig. 6
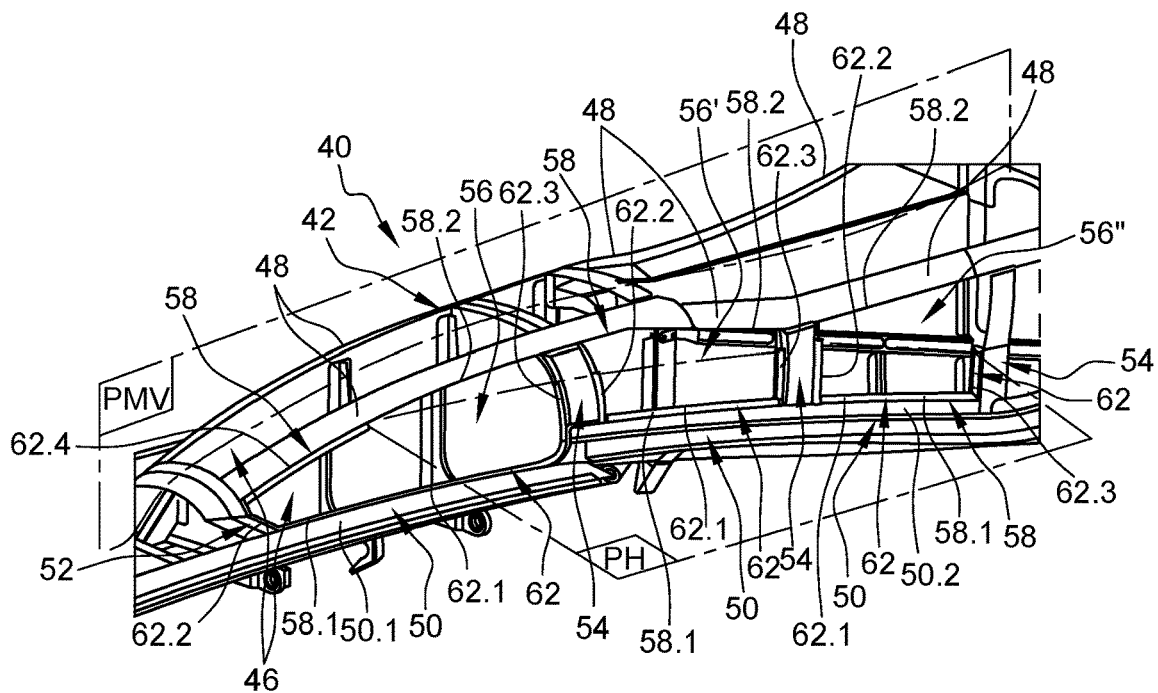
Fig. 7
Fig. 8

AIRCRAFT PYLON COMPRISING AT LEAST ONE SEAL INTERPOSED BETWEEN A FIXED STRUCTURE AND A REMOVABLE PANEL OF A FAIRING

CROSS-REFERENCES TO RELATED APPLICATIONS

This application claims the benefit of the French patent application No. 2006037 filed on Jun. 10, 2020, the entire disclosures of which are incorporated herein by way of reference.

FIELD OF THE INVENTION

The present application relates to an aircraft pylon comprising at least one seal interposed between a fixed structure and a removable panel of a fairing.

BACKGROUND OF THE INVENTION

As depicted in FIGS. 1 and 2, an aircraft 10 comprises multiple propulsion units 12 positioned beneath the wing 14. Each propulsion unit 12 comprises an engine 16, a nacelle 18 positioned around the engine, and a pylon 20 that provides the connection between the engine 16 and the wing 14.

For the present application, a longitudinal direction is parallel to the axis of the engine 16. A vertical direction corresponds to the direction of gravity when the aircraft is on the ground. A transverse direction is a direction perpendicular to the longitudinal and vertical directions. The terms front and rear refer to the flow direction of the flow of air in the engine in operation. The terms upper and lower refer to a position along the vertical axis, an upper element being further from the ground than a lower element when the aircraft is on the ground.

The pylon 20 comprises a structure 22, shown in FIG. 3, and a fairing 24 covering structure 22, shown in FIG. 2.

According to one embodiment shown in FIG. 3, the structure 22 comprises vertical longitudinal webs 26 that are spaced apart from one another and are approximately parallel to the axis of the engine 16. For each vertical longitudinal web 26, the structure 22 comprises an upper rim 28 positioned at its upper edge, a lower rim 30 spaced apart from the vertical longitudinal web 26, multiple transverse rims 32, 34 connecting the upper and lower rims 28, 30, a front transverse rim 32 connecting the front ends of the upper and lower rims 28, 30, intermediate transverse rims 34 being spaced apart from one another and offset to the rear with respect to the front transverse rim 32.

The upper, lower and transverse rims 28, 30, 32, 34 delimit voids 56.

The fairing 24 comprises multiple removable panels 38, 38', 38" connected to the upper, lower and transverse rims 28, 30, 32, 34. According to one configuration, a first removable panel 38 is secured against the lower rim 30, as shown in FIG. 4, and the second and third removable panels 38', 38" are secured against one of the intermediate transverse rims 34, as shown in FIG. 5.

The connections between the removable panels 38, 38', 38" and the upper, lower and transverse rims 28, 30, 32, 34 are configured to ensure ventilation beneath the fairing. However, this embodiment does not make it possible to contain any liquids inside the fairing 24.

The present invention seeks to remedy all or some of the drawbacks of the prior art.

SUMMARY OF THE INVENTION

To that end, the invention relates to an aircraft pylon comprising a structure that is covered by a fairing, the structure comprising at least one void bounded by a peripheral edge, the fairing comprising at least one removable panel connected to the structure around the void and having an inner face oriented towards the structure.

According to the invention, the structure comprises at least one seal extending over at least one lower portion of the peripheral edge, connected to the structure so as to be slightly compressed against the inner face of the removable panel when the removable panel is secured to the structure so as to retain a liquid inside the fairing.

This arrangement makes it possible to retain a fluid inside the fairing and to avoid the fluid leaking out of the fairing, while ensuring ventilation beneath the fairing.

According to another feature, each seal has a rabbet and the structure comprises at least one support that is configured to cooperate with the rabbet.

According to another feature, the support is an element distinct from the peripheral edge, in the form of an angle bar secured to the structure and positioned close to the peripheral edge, which has an edge that fits into the rabbet of the seal.

According to another feature, the support and at least one part of the peripheral edge form only a single item, the peripheral edge having an edge that fits into the rabbet of the seal.

According to another feature, each seal has a tubular body that is configured to come into contact with the inner face of the removable panel.

According to one embodiment, the peripheral edge of a first void comprises an upper rim, a lower rim, a front transverse rim and an intermediate transverse rim, a first front part of the upper rim, the front intermediate rim, the lower rim and a first lower part of the intermediate transverse rim being positioned below a sealing horizontal plane. According to this embodiment, the seal comprises a first segment that extends over the entire length of the lower rim, a second segment that extends over the entire length of the front intermediate rim, a third segment that extends over the first lower part of the intermediate transverse rim and a fourth segment that extends over the first front part of the upper rim.

According to another embodiment, the peripheral edge of a second or third void comprises an upper rim, a lower rim, first and second transverse rims, at least a lower part of the first intermediate transverse rim, the lower rim and at least a lower part of the second intermediate transverse rim being positioned below a sealing horizontal plane. According to this embodiment, the seal comprises a first segment that extends over the entire length of the lower rim, a second segment that extends over the lower part of the first intermediate transverse rim, and a third segment that extends over the lower part of the second intermediate transverse rim.

The invention also relates to an aircraft comprising at least one aircraft pylon according to one of the preceding features.

BRIEF DESCRIPTION OF THE DRAWINGS

Other features and advantages will emerge from the following description of the invention, which description is given solely by way of example, with reference to the appended drawings in which:

FIG. 4 is a section through a part of a removable panel of a fairing and of a lower rim of a structure of an aircraft pylon, illustrating one embodiment of the prior art, FIG. 5 is a section through two removable panels of a fairing and of a transverse rim of a structure of an aircraft pylon, illustrating one embodiment of the prior art, FIG. 6 is a perspective view of a structure of an aircraft pylon without a fairing, illustrating an embodiment of the invention, FIG. 7 is a perspective view of a part of a lower rim of the structure shown in FIG. 6, fitted with seals, FIG. 8 is a perspective view of an intermediate transverse rim of the structure shown in FIG. 6, fitted with seals.

DETAILED DESCRIPTION OF THE PREFERRED EMBODIMENTS

Figure 1:
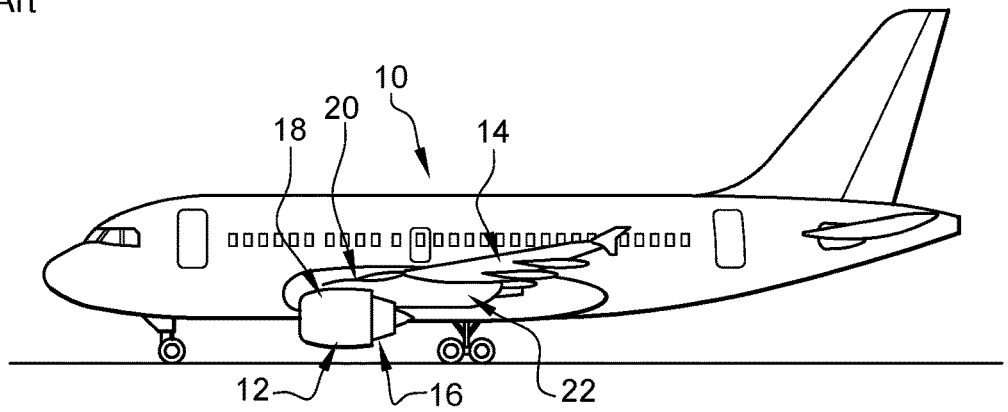
FIG. 1 is a side view of an aircraft, illustrating one embodiment.
Figure 2:
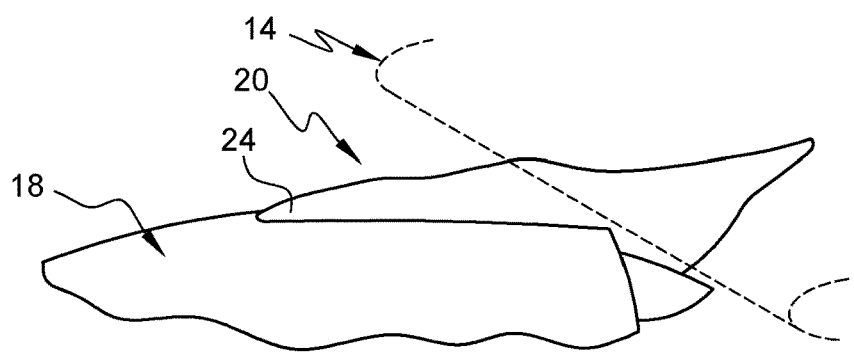
FIG. 2 is a perspective view of an aircraft pylon, illustrating one embodiment.
Figure 3:
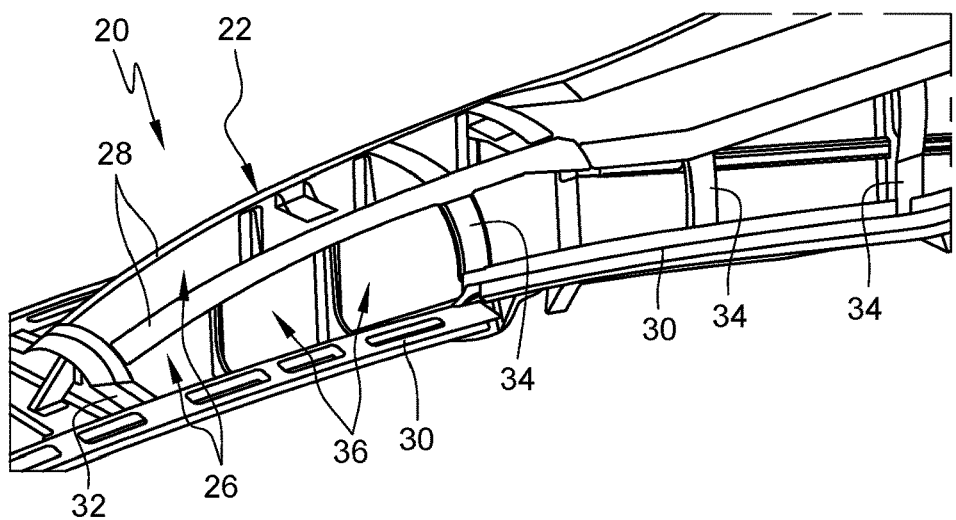
FIG. 3 is a perspective view of an aircraft pylon without a fairing, illustrating an embodiment of the prior art.

According to one embodiment, shown in FIG. 6, an aircraft pylon 40 comprises a structure 42 covered with a fairing 44 that is partially shown in FIGS. 10 to 13. The structure 42 comprises vertical longitudinal webs 46 that are spaced apart from one another and are approximately parallel to the axis of the engine of the aircraft. The structure 42 is essentially symmetric with respect to a vertical median plane PMV.

Each vertical longitudinal web 46 has an upper edge and an upper rim 48 positioned at the upper edge of the vertical longitudinal web 46.

The structure 42 comprises two lower rims 50, positioned on either side of the vertical longitudinal webs 46, each one of the lower rims 50 being spaced apart from one of the vertical longitudinal webs 46 in the transverse direction and in the vertical direction, the lower rim 50 being downwardly offset with respect to the upper edge 48 and further away from the vertical median plane PMV.

Figure 11:
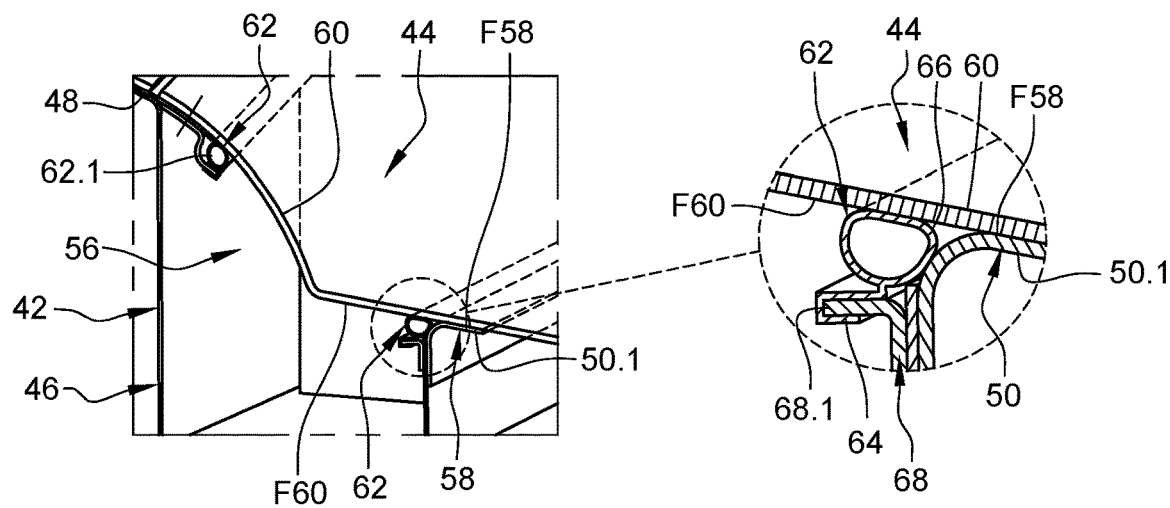
FIG. 11 is a perspective section through a panel of a fairing and a structure of an aircraft pylon, illustrating one embodiment of the invention.
Figure 12:
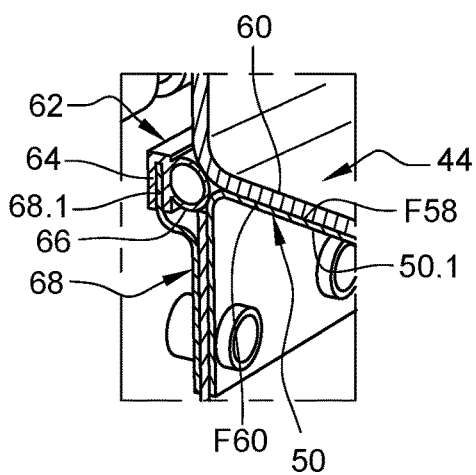
FIG. 12 is a perspective section through a panel of a fairing and a lower edge of a structure of an aircraft pylon, illustrating another embodiment of the invention.

According to one embodiment, the lower edge 50 comprises a first segment 50.1 that is essentially horizontal, as shown in FIGS. 6, 11 and 12, and a second segment 50.2 that is essentially vertical, as shown in FIGS. 6, 7, 9 and 13.

The structure 42 also comprises transverse rims 52, 54 connecting the upper and lower edges 48, 50 on either side of the vertical median plane PMV, a front transverse rim 52 connecting the front ends of the upper and lower rims 48, 50, at least one intermediate transverse rim 54 being offset to the rear with respect to the front transverse rim 52. This front transverse rim 52 is approximately oriented along a transverse direction.

The upper, lower and transverse rims 48, 50, 52, 54 delimit voids 56.

Of course, the invention is not restricted to this embodiment for the structure 42.

Whatever the embodiment, the structure 42 comprises at least one void 56 that is bounded by a peripheral edge 58 surrounding the void 56 which has at least one lower portion 58.1 positioned below a sealing horizontal plane PH and at least one upper portion 58.2 positioned above the sealing horizontal plane PH. This sealing horizontal plane PH corresponds to a level below which a liquid present inside the fairing 44 does not escape to outside the fairing 44.

The peripheral edge 58 of each void 56 may comprise a single circular rim in the case of a circular void, or multiple rims 48, 50, 52 and 54 depending on the geometry of the void 56.

Thus, a void 56 comprises a bottom wall, formed in the structure 42, which is leak tight, and at least one peripheral edge 58 that is connected to the bottom wall in a leak tight manner. Thus, a void 56 can retain fluids such as liquids.

The fairing 44 comprises at least one removable panel 60 connected to the structure 42, in particular at the upper, lower and transverse rims 48, 50, 52, 54, by connecting elements. The removable panels 60 and the connecting elements are not described in greater detail, since they can be identical to those of the prior art.

Whatever the embodiment, each removable panel 60 has an inner face F60 oriented towards the structure 42, the peripheral edge 58 of each void 56 having an outer face F58 oriented towards the removable panel 60. For each void 56, the fairing 44 comprises a removable panel 60 connected to the structure 42 around the void 56.

A void 56 is therefore bounded by its bottom wall formed in the structure 42 and its peripheral edge(s) 58, and is closed by a removable panel 60.

The structure 42 comprises, for each void 56, at least one seal 62 which is secured to the structure 42 and extends over the entire lower portion 58.1 of the peripheral edge 58 of the void 56, and which is in contact with at least one removable panel 60 of the fairing 44 when the removable panel 60 is connected to the structure 42.

The opening of the void 56, which is closed by the removable panel 60, is therefore rendered leak tight at least over a lower portion 58.1 of its peripheral edge 58. Thus, the seal 62 makes it possible to increase the ability of the void 56 to retain a fluid in the void 56 closed by the removable panel 60.

Figure 13:
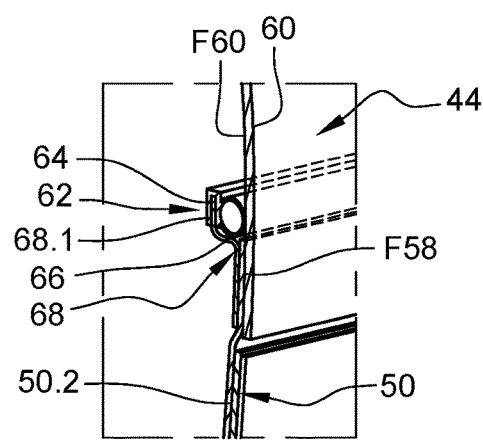
FIG. 13 is a perspective section through a panel of a fairing and a lower edge of a structure of an aircraft pylon, illustrating another embodiment of the invention.

According to one embodiment, shown more particularly in FIGS. 11 to 13, each seal 62 has a rabbet 64 that is configured for connecting it directly or indirectly to the structure 42. Each seal 62 has, in addition to the rabbet 64, a tubular body 66 that is configured to come into contact with the inner face F60 of a removable panel 60. According to one configuration, the tubular body 66 has a circular cross section.

In operation, the rabbet 64 and the tubular body 66 are configured in such a way that the tubular body 66 is slightly crushed against the inner face F60 of a removable panel 60.

The rabbet 64 and the tubular body 66 form only a single item made of plastic material, such as elastomer, for example.

The structure 42 comprises at least one support 68, 68' which is configured to cooperate with the rabbet 64 of the seal 62 in order to connect it to the structure 42.

According to one embodiment, shown in FIGS. 11 to 13, the support 68 is an element distinct from the peripheral edge 58. According to this embodiment, the support 68 is an angle bar secured to the structure 42 and positioned close to the peripheral edge 58, which has an edge 68.1 that fits into the rabbet 64 of the seal 62.

Figure 9:
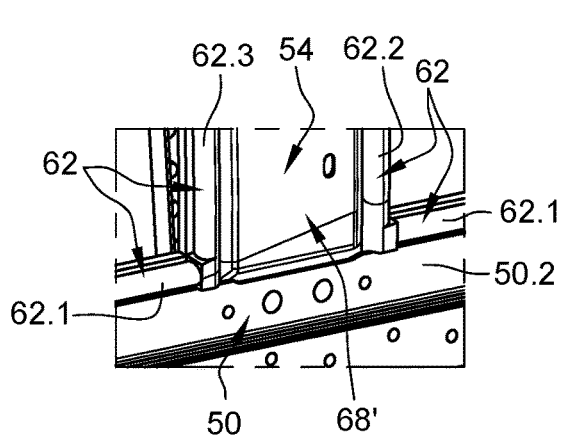
FIG. 9 is a perspective view of the lower rim shown in FIG. 7 and of the intermediate transverse rim shown in FIG. 8, assembled.
Figure 10:
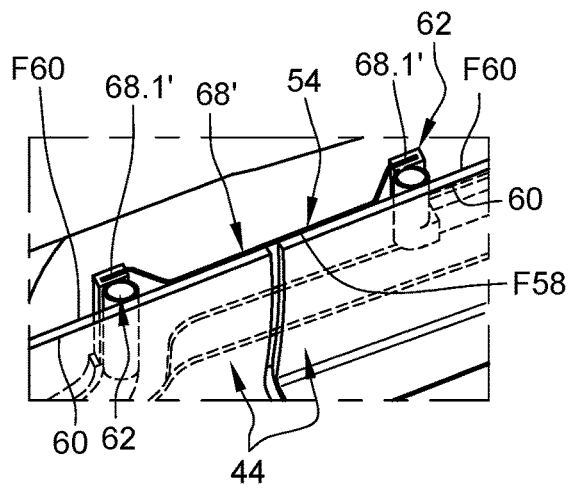
FIG. 10 is a perspective section through two removable panels of a fairing and of an intermediate transverse rim of a structure of an aircraft pylon, illustrating one embodiment of the invention.

According to another embodiment, shown in FIGS. 8 to 10, the support 68' and at least one part of the peripheral edge 58 form only a single item, the peripheral edge 58 having an edge 68.1' that fits into the rabbet 64 of the seal 62. According to a configuration shown in FIG. 10, at least one of the intermediate transverse rims 54 acts as a support 68' and comprises two edges that fit into the rabbets 64 of two seals 62.

According to an embodiment shown in FIG. 6, for each void 56, the seal 62 comprises multiple segments placed end-to-end.

According to one configuration, the structure 42 comprises a first void 56, located further forward, and a second void 56' and a third void 56".

For the first void 56, a first front part of the upper rim 48, the front transverse rim 52, the lower rim 50 and a first lower part of the intermediate transverse rim 54 are positioned below the sealing horizontal plane PH. Thus, for the first void 56, a second rear part of the upper rim 48 (matching the first front part) and a second upper part of the intermediate transverse rim 54 (matching the first lower part) are positioned above the sealing horizontal plane PH. For the first void 56, the seal 62 comprises a first segment 62.1 that extends over the entire length of the lower rim 50, a second segment 62.2 that extends over the entire length of the front intermediate rim 52, a third segment 62.3 that extends over the first lower part of the intermediate transverse rim 54 and a fourth segment 62.4 that extends over the first front part of the upper rim 48.

For each of the second and third voids 56', 56", at least a lower part of a first intermediate transverse rim 54, the lower rim 50 and at least a lower part of a second intermediate transverse rim 54 are positioned below the sealing horizontal plane PH. For each of the second and third voids 56', 56", the seal 62 comprises a first segment 62.1 that extends over the entire length of the lower rim 50, a second segment 62.2 that extends over the lower part of the first intermediate transverse rim 54, and a third segment 62.3 that extends over the lower part of the second intermediate transverse rim 54.

Whatever the embodiment, the structure 42 comprises at least one seal 62 that extends over the entire length of at least one lower portion 58.1 of the peripheral edge 58 of at least one void 56, the seal 62 being connected to the structure 42 such that it is slightly compressed against the inner face F60 of a removable panel 60 of the fairing 44 when the removable panel 60 is secured to the structure 42.

In order to ensure optimal sealing, the structure 42 comprises, for each lower portion 58.1 of the peripheral edge 58 of each void 56, a seal 62 that extends over the entire length of the lower portion 58.1, the seal 62 being connected to the structure 42 such that it is slightly compressed against the inner face F60 of a removable panel 60 of the fairing 44 when the removable panel 60 is secured to the structure 42.

For at least one of the voids 56 of the structure 42, the seal 62 does not extend over the entire perimeter of its peripheral edge 58, ensuring ventilation beneath the fairing 44. According to one configuration, for each one of the voids 56, the seal 62 does not extend over the entire perimeter of their peripheral edges 58.

The invention makes it possible to retain a fluid inside the fairing 44 and to avoid the fluid leaking outside the fairing 44 up to a certain level corresponding to the sealing horizontal plane PH, while ensuring ventilation beneath the fairing 44.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft pylon comprising:
a structure covered with a fairing,
the structure comprising:
a void comprising a bottom wall, formed in the structure, and a peripheral edge connected to the bottom wall,
wherein the peripheral edge of the void comprises an upper rim, a lower rim, a front transverse rim and an intermediate transverse rim,
wherein a first front part of the upper rim, the front transverse rim, the lower rim and a first lower part of the intermediate transverse rim are positioned below a sealing horizontal plane,
the fairing comprising:
at least one removable panel connected to the structure around the void and having an inner face oriented towards the structure,
wherein the structure comprises a liquid-tight seal, wherein the liquid-tight seal comprises a first segment that extends over an entire length of the lower rim, a second segment that extends over an entire length of the front transverse rim, a third segment that extends over the first lower part of the intermediate transverse rim, and a fourth segment that extends over the first front part of the upper rim so as to be slightly compressed against the inner face of the removable panel when said removable panel is secured to the structure, so as to retain a liquid inside the fairing below the sealing horizontal plane, wherein ventilation beneath the fairing is ensured.

2. The aircraft pylon as claimed in claim 1,
wherein the liquid-tight seal has a rabbet, and
wherein the structure comprises at least one support that is configured to cooperate with the rabbet.

3. The aircraft pylon as claimed in claim 2, wherein the support is an element distinct from the peripheral edge, the support is formed as an angle bar secured to the structure and positioned close to the peripheral edge, the support having an edge that fits into the rabbet of the liquid-tight seal.

4. The aircraft pylon as claimed in claim 2, wherein the support and at least one part of the peripheral edge form a single item, the peripheral edge having an edge that fits into the rabbet of the liquid-tight seal.

5. The aircraft pylon as claimed in claim 1, wherein the liquid-tight seal has a tubular body configured to come into contact with the inner face of the removable panel.

6. The aircraft pylon as claimed in claim 1,
wherein the peripheral edge of a second or third void comprises an upper rim, a lower rim, first and second intermediate transverse rims,
wherein at least a lower part of the first intermediate transverse rim, the lower rim and at least a lower part of the second intermediate transverse rim are positioned below a sealing horizontal plane.

7. An aircraft comprising at least one aircraft pylon as claimed in claim 1.

* * * * *